(12) United States Patent
O'Sullivan

(10) Patent No.: US 7,331,217 B2
(45) Date of Patent: Feb. 19, 2008

(54) RE-USABLE MAIN DRAIN TESTING METHOD AND APPARATUS

(76) Inventor: Raymond O'Sullivan, 108 Church St., West Roxbury, MA (US) 02132

( * ) Notice: Subject to any disclaimer, the term of this patent is extended or adjusted under 35 U.S.C. 154(b) by 126 days.

(21) Appl. No.: 11/199,045

(22) Filed: Aug. 8, 2005

(65) Prior Publication Data

US 2007/0028675 A1    Feb. 8, 2007

(51) Int. Cl.
*G01M 3/08* (2006.01)
*G01M 3/14* (2006.01)
*G01M 3/22* (2006.01)

(52) U.S. Cl. .............................. 73/49.1; 73/40; 73/49.8

(58) Field of Classification Search ................. 73/40, 73/49.1, 49.8
See application file for complete search history.

(56) References Cited

U.S. PATENT DOCUMENTS

| | | | | |
|---|---|---|---|---|
| 3,459,229 A | * | 8/1969 | Croft | 138/90 |
| 3,756,072 A | * | 9/1973 | MacMurray | 73/40.5 R |
| 4,103,537 A | * | 8/1978 | Victor | 73/40.5 R |
| 4,813,569 A | * | 3/1989 | Ruiz | 220/254.8 |
| 5,201,213 A | * | 4/1993 | Henning | 73/49.2 |
| 5,512,976 A | * | 4/1996 | Kamano | 399/116 |
| 5,574,213 A | * | 11/1996 | Shanley | 73/40.7 |
| 6,267,000 B1 | * | 7/2001 | Harper et al. | 73/40.5 R |
| 6,651,486 B1 | * | 11/2003 | Johnson et al. | 73/40 |
| 6,912,890 B2 | * | 7/2005 | Brewer | 73/40 |
| 7,013,711 B1 | * | 3/2006 | Herbers | 73/49.1 |

* cited by examiner

*Primary Examiner*—Daniel S. Larkin
(74) *Attorney, Agent, or Firm*—Robert K. Tendler

(57) ABSTRACT

A removable, convenient main drain testing system is provided through the use of a testing device that includes a cap clampable about a drain pipe, an air pressure gauge, a valve and connection to an air compressor. The assembly can be moved from one jobsite to the other with ease and can be transported in a plumber's tool kit without cumbersome apparatus. The test involves injecting compressed air into the system with the valve open, followed by closing of the valve when a test pressure has been obtained and observing the pressure gauge to look for pressure drops indicating leaks. The valve also is useful for the introduction into higher pressure air to ascertain where leaks are occurring should any be observed.

12 Claims, 2 Drawing Sheets

RE-USABLE MAIN DRAIN TESTING METHOD AND APPARATUS

FIELD OF THE INVENTION

This invention relates to plumbing and more particularly to leak testing of main and branch drains in a residential or commercial building.

BACKGROUND OF THE INVENTION

As mandated by many building codes, for new construction or substantial remodeling of old construction, the integrity of main and branch drains must be maintained to avoid leaks that result in sewer gas throughout the building or dwelling. In order to assure that the plumbing is sound and has been done to appropriate standards, it is a common test to cap off all of the branch drains as well as the main drain at the cleanout before it goes into the sewer system and to pour water into the stack that extends above the roof of the building.

It will be appreciated, however, that water testing is relatively dangerous in that one must deliver a supply of water to the stack so that the entire system is filled with water from at least six feet above the highest fixture.

As a matter of course, plumbers have to go out onto the roof with a hose and proceed to the point where the stack comes up through the roof. The plumber then has to fill up the stack until the entire drain system is filled with water. This is a dangerous exercise because one has to get onto the roof and squirt water into the stack, typically leaving the roof wet.

In the presence of the inspector, then one has to observe all of the plumbing seals from roof to basement after having capped off or plugged off all of the waste lines, be they sink waste, toilet pipes, shower waste, vanity waste or like waste lines. This is typically done by either capping the waste line at the fixture or by inserting an inflatable ball so as to seal off all of the waste pipe as well as the bottom-most part of the main drain.

The problem with water testing is that leaks do not necessarily show up immediately and may become evident as much as two to three weeks after the initial testing. Thus, while water is traditionally used to test main drains and their feeder lines, it is not a failsafe method to establish the integrity or water tightness of the main drain system.

There is a further problem with using water to test for leaks and that is a conservation problem. If one fills the main drain and branches with water and a leak is detected, then to carry out the repair, the system needs to be drained, the repair effected and the stack re-filled with water to test the repair. It will be appreciated that in a typical commercial building as much as 200 gallons of water is necessary to fill up the main drain and its branches per test. Multiple tests per day for a given community lead to undue wastage of water.

Some building codes permit the use of pressurized air to test drains, but the types of apparatus utilized for air testing of a main drain and its feeders requires complicated apparatus which is left in place and is rarely if ever used.

Thus, although airtight integrity is contemplated in many of the building codes, due to the difficulty and time consuming nature of performing airtight integrity tests and due to the elaborate apparatus necessary to perform such tests, this portion of the building code is largely ignored by building inspectors and plumbers alike.

SUMMARY OF INVENTION

In order to alleviate the problem of performing watertight integrity tests of the main drains and their branches, and in order to provide a simplified re-usable testing method and apparatus that can be transported from one location to the other by a plumber and used as a routine tool that is simple to use, in the subject invention a portable tester is releasably attachable to a waste pipe somewhere in the building. For this purpose, in one embodiment the tester is provided with a resilient cap that is clamped over a one-and-a-half-inch or two-inch waste pipe end anywhere within the building or dwelling, usually at the kitchen sink's outlet drain pipe. The resilient cap is clamped over the one-and-a-half-or two-inch pipe through the use of a hose clamp, with the center of the cap being provided with a fitting that goes through its center or top portion and is sealed to the resilient cap.

A pipe extends from the fitting and is provided with a valve to permit sealing off the pipe below the valve. Between the valve and the cap is provided a pressure gauge that in one embodiment is set to have a range including the five-pound test pressure specified by many building codes.

Above the valve is a quick-connect nipple or a sniffer to which an electric air pump, compressor or other air supply is attached.

After having sealed the main drain at its cleanout and stack and having sealed each of the branch drains by capping the waste pipes at the fixtures, a conveniently located waste pipe, normally available at the kitchen sink, is connected to the subject removable tester, with the cap clamped onto the exposed sink drain pipe.

It will be appreciated that not only must the branch drains be capped at their ends, either with caps or balls, the stack must also be sealed. This can be conveniently accomplished by cutting the stack in the attic and capping it, with the main drain cleanout being provided with an inflatable ball to seal it in the basement.

In operation, when the testing gauge has been clamped to the selected drain pipe, the valve is opened and five pounds of air pressure is applied to the system from the compressor coupled to the distal end of the valve. When the system has been pressurized to, for instance, five pounds, the valve is closed and the plumber observes the gauge to see if there is a drop in pressure throughout the system.

If there is no drop in pressure, this will be witnessed by the inspector and the system will be declared leak free.

One of the advantages of the subject system is that any leaks will appear immediately as a pressure drop at the gauge so that one does not have to wait days or weeks, as would be the case in a water test, in order to ascertain that there is the potential for sewer gas leakage throughout the building or dwelling.

If leaks are determined by the dropping of the pressure at the pressure gauge, the pressure into the valve may be increased after opening the valve to, for instance, ten to fifteen pounds. Typically, a leak will be ascertained by a hissing or whistling sound, which occurs as the air rushes out through the leaky joint. Alternatively, one can coat all of the joints with soapy water and observe bubbles to ascertain where the leak or leaks are occurring.

What will be appreciated is that with a simple removable testing device clamped to an easily accessible branch drain pipe, a plumber and inspector can quickly ascertain the integrity of the main drain system and its branches. Thus, rather than having to deal with the spraying of water into a stack and observing leaks by the leakage of water, the subject system provides easy access to initiate the test at any convenient branch drain pipe. Also, there is no mess involved because, should leaks occur, the only indication will be hissing air as opposed to water drips.

In summary, a removable, convenient main drain testing system is provided through the use of a testing device that includes a cap clampable about a drain pipe, an air pressure gauge, a valve and connection to an air compressor. The assembly can be moved from one jobsite to the other with ease and can be transported in a plumber's tool kit without cumbersome apparatus. The test involves injecting compressed air into the system with the valve open, followed by closing of the valve when a test pressure has been obtained and observing the pressure gauge to look for pressure drops indicating leaks. The valve also is useful for the introduction into higher pressure air to ascertain where leaks are occurring should any be observed.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
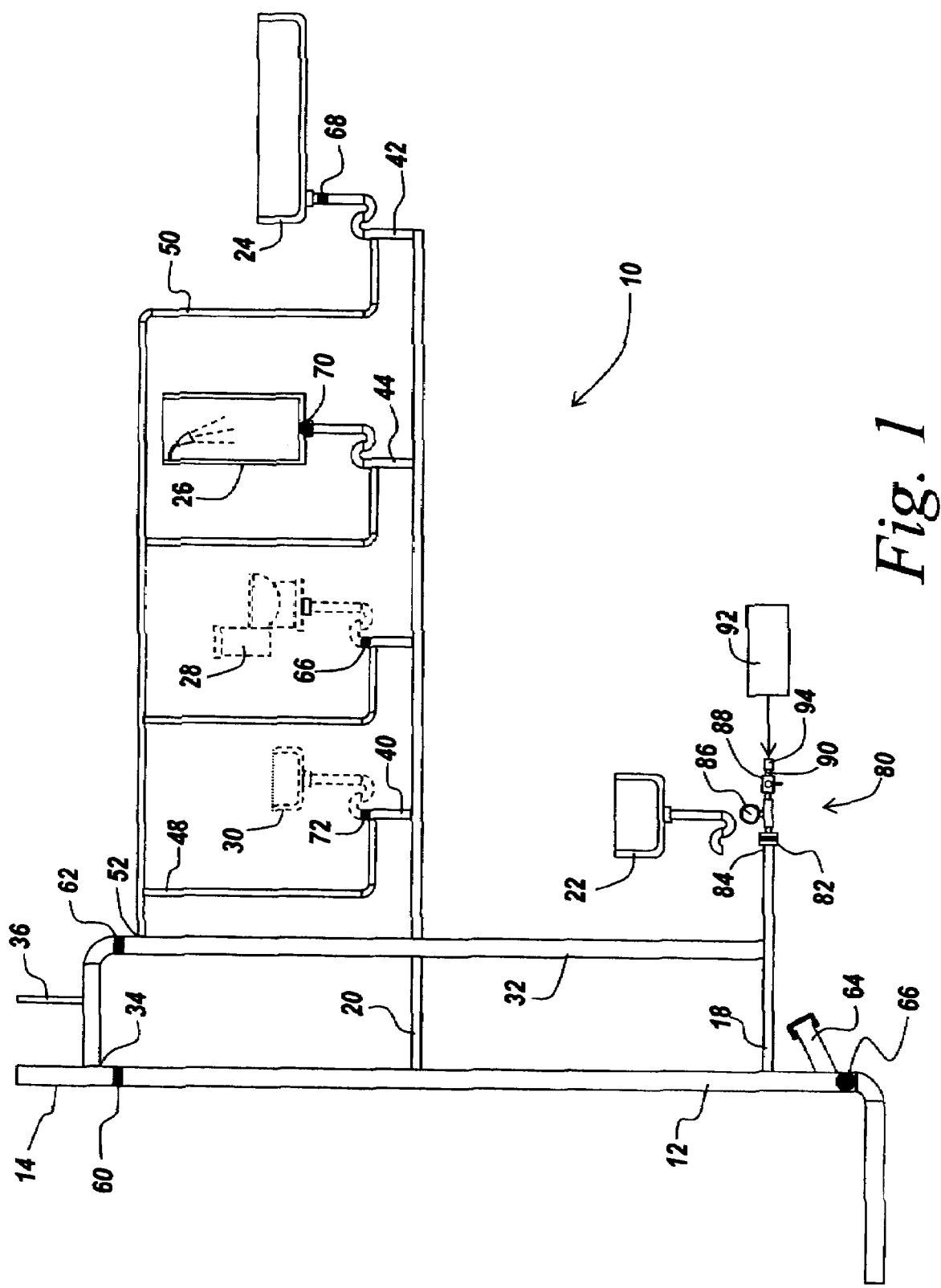
FIG. 1 is a diagrammatic illustration of a main drain and branch drain system in a building indicating the sealing of the main drain and branch drains; and the clamping of the removable tester to a kitchen sink drain pipe, with the supply of air to the drain system provided through the removable tester; and, FIG. 2 is a diagrammatic illustration of the subject testing tool, indicating a resilient cap, pressure gauge, valve and air introduction nipple.

Referring to FIG. 1, a main drain generally indicated at 10 includes a drainpipe 12 and a stack 14, with branch drains 18 adapted to be coupled to a kitchen sink 22, a tub 24, a shower stall 26, a toilet 28 and a vanity 30. For each of these fixtures coupled to the branch drains, a vent pipe is necessary. Here the vent for branch drain 18 is shown at 32 to be coupled to stack 14 at joint 34. Optionally, a separate vent pipe 36 may be used to vent the vent pipes by tapping into vent pipe 32.

As illustrated, main drain branch 20 has a subsidiary branch 40 going to vanity 30, with sub-branch 42 going to tub 24 and sub-branch 44 going to shower stall 26. Each of these sub-branches has respective vent pipes 48 and 50 that attach to vent pipe 32 at junction 52.

In order to check the main and branch drain system, the system is capped off by a series of caps. As illustrated, cap 60 is located below point 34 where the vent pipe goes into stack 14, and vent pipe 32 is capped at a point 62 above junction 52 at which vent pipes 48 and 50 attach to vent pipe 32.

In the basement, at the cleanout 64 of main drain 12, a ball or bladder 66 called a test ball is inflated to seal the main drain below the cleanout.

Moreover, test ball 66 is placed at the toilet 28 waste drain pipe, and waste pipe 42 is capped at 68 at tub 24. An inflatable ball 70 is placed in the waste pipe 44 to shower stall 26, whereas a cap 72 is installed on waste pipe 40 for vanity 30.

In this manner all of the main and branch drains are sealed, with the exception of pipe 18, the pipe to which the subject testing tool is to be coupled.

Here, testing tool 80 has a resilient cap 82 clamped to end 84 of pipe 18, with the testing tool having a gauge 86 to record air pressure and a valve 88 to open and close a conduit 90 to which is attached a compressor 92 via a nipple 94 or like device.

In general, the pipe to which the tester is conveniently attached, which can be any of the waste pipes within the building, is typically a kitchen sink waste pipe that is usually a one-and-a-half-inch branch that is easily accessible not only to the plumber but also to the inspector who must certify that the main drain and branches are leak free.

In operation, valve 88 is opened to admit pressure from air compressor 92 into the main and branch drain system until such time as gauge 86 reads five pounds or the prescribed amount for the test. Valve 88 is then closed and gauge 86 is observed to see if the pressure on the gauge drops.

If the pressure on the gauge does not drop, then the structural integrity of all of the plumbing has been ascertained to be leak free.

If, however, the pressure drops, then valve 88 may be re-opened and compressor 92 set to a higher pressure, such as ten or fifteen pounds, so as to be able to detect where in the system the leak is occurring. Leak detection can be accomplished by increasing pressure sufficient to generate an outrush of air or a hissing sound at the site of the leak. Alternatively, soapy water can be applied to determine the location of the leak by the appearance of soap bubbles. Finally, if the air introduced includes colored material entrained therein, colored material will be visible at the leak site.

Figure 2:
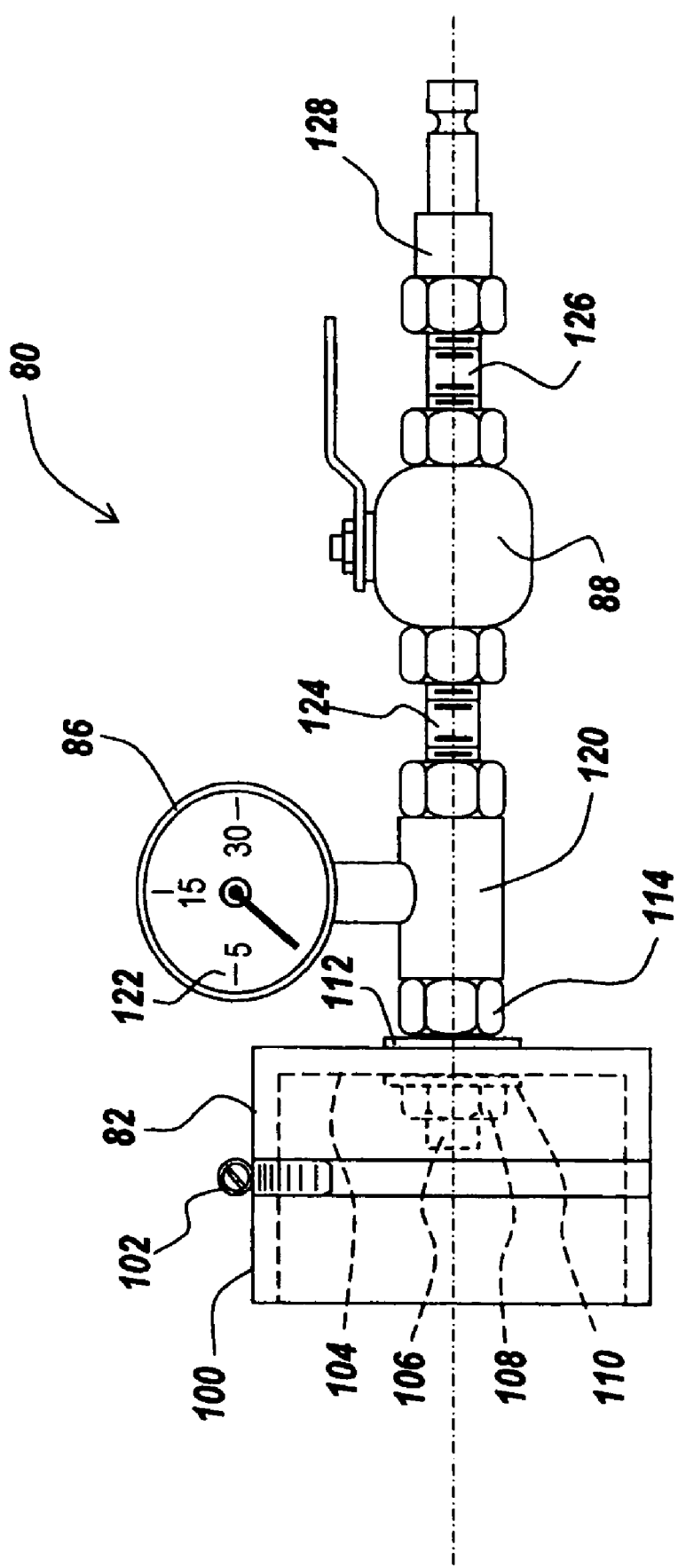

Referring now to FIG. 2, in one embodiment testing tool 80 includes resilient cap 82, which includes a circumferential outer channel 100 adapted to receive a seal actuator in the form of a hose clamp 102 so as to be able to clamp cap 82 about the appropriate waste drainpipe. Cap 82 has an interior top surface 104 through which an orifice is provided that permits the extension of a pipe 106 through its center. In one embodiment, this is a threaded pipe that has a nut 108 for securing the end of pipe 106 to top interior surface 104 of cap 82. Typically, a washer 110 is used so that nut 108 can bear upon an extended surface.

Cap 82 is provided with a top washer 112, which co-acts with a flanged end 114 of a T fitting 120 so that an airtight seal is made between the distal end of pipe 106 and fitting 120. T fitting 120 has an air pressure gauge 86 extending therefrom that provides a five-pound indication as illustrated at 122 as well as a fifteen and thirty-pound indicator scale.

Extending from the top of T fitting 120 is a threaded pipe 124 to which valve 88 is secured, with a threaded fitting 126 extending from the top portion of valve 88 that presents a nipple 128 or sniffer for the compressed air connection.

It will be appreciated that while the subject testing tool is indicated as having a number of parts, the entire testing tool can be made as an integral unit so as to minimize the number of parts necessary in its assembly.

What is therefore provided is a consistent way of testing main brains and branch drains in a residential or commercial building using air and a quick, portable testing tool that can be re-used. It offers the convenience and reliability of air testing for main drain inspections, as opposed to water testing and fully complies with building codes.

Moreover, access to the testing apparatus is done at any convenient point within the branch drain system so that the test can be readily performed at an easily accessible point and readily observed by an inspector. Moreover, since water testing is eliminated, dangerous operations on the top of a roof are completely eliminated.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for testing a main drain pipe and its branches, comprising the steps of:
    sealing the main drain pipe and its branches at their extremities except at one point where the main drain pipe or a branch drain pipe is exposed;
    attaching a removable and re-useable air pressure testing device to the exposed main drain or branch drain pipe, the testing device having in fluid communication an input air pressure orifice, an air pressure gauge, a releasably attachable airtight sealing member attached to the exposed pipe and a valve between the gauge and the input air pressure orifice for sealing the orifice when the valve is closed;
    introducing positive air pressure into the orifice to pressurize the main drain and its branches to a predetermined air pressure;
    closing the valve; and,
    observing the pressure level as determined by the pressure gauge to see if there is a reduction in the positive air pressure indicative of a leak.

2. The method of claim 1, wherein the releasably attachable member includes a resilient cap that surrounds the end of the exposed pipe for coupling of the test device thereto.

3. The method of claim 2, wherein the cap includes a hose clamp for clamping the resilient cap about the exposed pipe.

4. The method of claim 3, wherein the resilient cap includes an aperture and wherein the testing device includes a pipe through the aperture and sealed thereto, the pipe also in communication with the air pressure gauge.

5. The method of claim 4, wherein the pipe extends beyond the pressure gauge such that the end thereof forms the input air pressure orifice, and further including a fitting at the orifice to permit ready attachment of an air pressure hose.

6. The method of claim 1, and further including increasing the positive air pressure upon determination of an air leak, whereby the presence of the air leak can be determined by the outrush of air at the leak site.

7. The method of claim 6, wherein the pressure increase for determining leak position is sufficient to generate a hissing sound at the site of the leak.

8. The method of claim 6, wherein the air pressure increase permits ascertaining the leak through the application of soapy water, the location of the leak being determined by soap bubbles.

9. The method of claim 1, wherein the air introduced into the orifice includes colored material entrained in the air and wherein a leak is determined by the presence of the colored material at the leak site.

10. A method for on-the-spot testing of a main drain and the branch drains thereof for leaks, with the test results being visible by an inspector without endangering either the inspector or the person performing the test, comprising the steps of:
    with the exception of an unsealed pipe, sealing the extremities of the main drain and the branch drains thereof against the passage of air past the seal;
    locating the unsealed pipe;
    releasably attaching a re-useable testing tool to the unsealed pipe using a resilient clampable cap, the testing tool having an air gauge for determining the pressure within the main drain and branch drains;
    introducing air under positive pressure through the testing tool and into the main drain and the branch drains until a predetermined test pressure has been attained;
    clamping off the air pressure;
    measuring the positive air pressure in the main drain and the branch drains to ascertain by a drop in positive air pressure the presence of a leak; and,
    removing the testing tool from the unsealed pipe.

11. The method of claim 10, wherein the unsealed pipe to which the testing tool is coupled includes a branch pipe.

12. The method of claim 11, wherein the branch pipe includes the drain for a kitchen sink, whereby the testing tool may be located at a site for both the performing of the test and the inspection thereof by the inspector from a location.

* * * * *